(12) United States Patent
Farrell et al.

(10) Patent No.: US 12,542,396 B2
(45) Date of Patent: *Feb. 3, 2026

(54) ELECTRICAL CONNECTOR WIRE SEAL ASSEMBLY THAT IS SUBSTANTIALLY RIGID ALONG A FIRST AXIS

(71) Applicant: Aptiv Technologies AG, Schaffhausen (CH)

(72) Inventors: Jack Farrell, Streetsboro, OH (US);
Matthew L. Penn, Cortland, OH (US);
Gert Droesbeke, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 393 days.

This patent is subject to a terminal disclaimer.

(21) Appl. No.: 18/207,360

(22) Filed: Jun. 8, 2023

(65) Prior Publication Data
US 2024/0413569 A1    Dec. 12, 2024

(51) Int. Cl.
*H01R 13/52* (2006.01)
*H01R 13/15* (2006.01)

(52) U.S. Cl.
CPC ......... *H01R 13/5205* (2013.01); *H01R 13/15* (2013.01); *H01R 13/5216* (2013.01)

(58) Field of Classification Search
CPC ............ H01R 13/5205; H01R 13/5219; H01R 13/5221; H01R 13/5216; H02G 15/013
See application file for complete search history.

(56) References Cited

U.S. PATENT DOCUMENTS

| | | | |
|---|---|---|---|
| 4,735,581 A | 4/1988 | Endo et al. | |
| 7,207,840 B2 * | 4/2007 | Fukushima | H01R 13/5221 439/589 |
| 9,899,821 B2 * | 2/2018 | Natter | H02G 3/088 |
| 10,148,032 B1 * | 12/2018 | Brantingham | H01R 13/5205 |
| 11,081,830 B2 * | 8/2021 | Minamino | B29C 45/14336 |
| 12,244,091 B2 * | 3/2025 | Farrell | H01R 43/005 |
| 2006/0019535 A1 | 1/2006 | Fukushima et al. | |
| 2014/0008122 A1 | 1/2014 | Imahori et al. | |
| 2018/0351286 A1 | 12/2018 | Brantingham et al. | |
| 2021/0057845 A1 | 2/2021 | Minamino | |

FOREIGN PATENT DOCUMENTS

| | | |
|---|---|---|
| JP | H04284383 A | 10/1992 |
| JP | H09147965 A | 6/1997 |

OTHER PUBLICATIONS

"9.5 YPT WP Connector Single Wire Seal", Yazaki Corporation; 7158-3672-50; 1 page; Jun. 27, 2007.
"Extended European Search Report"; European Patent Office; received Feb. 27, 2024; 13 Pages.

* cited by examiner

*Primary Examiner* — Vanessa Girardi
(74) *Attorney, Agent, or Firm* — Billion & Armitage

(57) ABSTRACT

A wire seal assembly configured to seal a wire cable to a connector housing of an electrical connector includes a seal reinforcement device configured to be substantially rigid along a first axis. The wire seal assembly also has a compliant cable seal that is disposed within the seal reinforcement device and is in compressive contact with the wire cable. The wire seal assembly further incorporates a compliant housing seal axially that surrounds the seal reinforcement device. The housing seal is in compressive contact with the connector housing.

15 Claims, 9 Drawing Sheets

ELECTRICAL CONNECTOR WIRE SEAL ASSEMBLY THAT IS SUBSTANTIALLY RIGID ALONG A FIRST AXIS

TECHNICAL FIELD

This disclosure is generally directed to sealed electrical connectors and more particularly to an electrical connector having a wire seal that provides a secondary terminal locking mechanism.

BACKGROUND

In many applications, it is necessary to mount electrical cables to terminals or connector housings and to seal the connection against environmental contaminants, such as moisture, dust, etc. To this end so-called single wire seals are known in the art, which are arranged onto the cable sheath, and which provide a seal between the cable and inner walls of the terminal or the connector housing.

A typical prior art document dealing with elastic single wire seals is U.S. Pat. No. 4,895,533. This document discloses a waterproof plug for a connector. The waterproof plug comprises a rubber plug having an outer tube portion capable of fitting to an inner wall of a connector housing, a stabilizing tube having rigidity mounted next to the outer tube portion of said rubber plug, and an electric wire inserting hole in the central portion thereof. Another prior art document dealing with elastic single wire seals is German Patent No. DE 19 828 482 A1 disclosing a single wire seal for sealing a gap between a conductor and a connector housing. A reinforcement region is joined to a sealing region of a sealing body. Further, reinforcement ribs are connected on a first side to a hollow cylindrical base of the reinforcement region, and on an adjacent second side to a sealing lip.

Lateral compression of the seal is necessary for forming a seal between the wire cable and the connector housing. However, such a cable seal can also be longitudinally compressed causing unwanted movement of the terminal in the connector housing that can cause intermittent electrical disconnection and/or fretting corrosion of the terminal. Therefore, a cable seal that reduces or eliminates longitudinal compression while still allowing lateral compression remains desired.

FIG. 1 shows an example of an existing electrical connector 10 that is engaged with a mating electrical connector 110. The electrical connector 10 of FIG. 1 has a compliant wire seal 12 that is configured to surround a wire (not shown) attached to a terminal 14 disposed within a terminal module 16 in the connector's housing 18. The terminal module 16 is retained within the housing 18 by a primary locking mechanism 20 in the form of a cantilevered arm that extends from the housing 18 and engages the terminal module 16. The wire seal 12 is disposed between the terminal module 16 and a wire seal retainer 22. The wire seal 12 provides a secondary locking mechanism that inhibits the terminal module 16 from being forced from the connector housing 18 in the event of a failure of the primary locking mechanism 20. However, because the wire seal 12 is made from a compliant material in order to seal against the walls of the housing 18 and the wire, the terminal module 16 may still be subject to longitudinal motion due to longitudinal compression of the wire seal 12 when a force is applied to the terminal 14 or the wire.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, a wire seal assembly configured to seal a wire cable to a connector housing of an electrical connector includes a seal reinforcement device configured to be substantially rigid along a first axis, a compliant cable seal disposed within the seal reinforcement device and in compressive contact with the wire cable, and a compliant housing seal axially surrounding the seal reinforcement device and in compressive contact with the connector housing.

In some aspects of the wire seal assembly described in the preceding paragraph, the seal reinforcement device is flexible along a second axis substantially perpendicular to the first axis.

In some aspects of the wire seal assembly described in any one of the preceding paragraphs, the seal reinforcement device includes a plurality of cylindrical sectors arranged opposite one another and a plurality of resilient spring features joining the plurality of cylindrical sectors.

In some aspects of the wire seal assembly described in any one of the preceding paragraphs, the plurality of resilient spring features include a pair of flexible beams that are joined at one end to form a V-shape and each of the opposite ends are attached to one of the cylindrical sectors.

In some aspects of the wire seal assembly described in any one of the preceding paragraphs, the plurality of resilient spring features are integrally formed with the plurality of cylindrical sectors.

In some aspects of the wire seal assembly described in any one of the preceding paragraphs, the seal reinforcement device is formed from a material selected from a list consisting of polyamide, polybutylene terephthalate, and acrylonitrile butadiene styrene, with or without glass filling.

In some aspects of the wire seal assembly described in any one of the preceding paragraphs, the seal reinforcement device is formed from a polymeric material having a Shore A hardness greater than 75.

In some aspects of the wire seal assembly described in any one of the preceding paragraphs, the cable seal and the housing seal are integrally formed.

In some aspects of the wire seal assembly described in any one of the preceding paragraphs, the cable seal and the housing seal are formed from a silicone rubber material.

In some aspects of the wire seal assembly described in any one of the preceding paragraphs, the cable seal and the housing seal are formed from a compliant polymeric material having a Shore A hardness in a range of 35 to 45.

In some aspects of the wire seal assembly described in any one of the preceding paragraphs, a material forming the seal reinforcement device has a Shore A harness at least 20 points higher than a material forming the cable seal and the housing seal.

In some aspects of the wire seal assembly described in any one of the preceding paragraphs, the seal reinforcement device extends beyond ends of the cable seal and the housing seal.

In some aspects of the wire seal assembly described in any one of the preceding paragraphs, the seal reinforcement device is flush with ends of the cable seal and the housing seal.

In some aspects of the wire seal assembly described in any one of the preceding paragraphs, the seal reinforcement device has a generally cylindrical shape.

According to one or more aspects of the present disclosure, a method of manufacturing a wire seal assembly includes injecting a rigid polymeric material having a shore A hardness of at least 75 when cured into a mold to form a seal reinforcement device and injecting a compliant polymeric material having a shore A hardness in a range of 35 to 45 when cured into a mold to form a cable seal within the seal reinforcement device and a tubular housing seal around the seal reinforcement device.

In some aspects of the method described in the preceding paragraph, the polymeric material is selected from a list consisting of polyamide, polybutylene terephthalate, and acrylonitrile butadiene styrene, with or without glass filling.

In some aspects of the method described in any one of the preceding paragraphs, the compliant polymeric material is a silicone rubber material.

According to one or more aspects of the present disclosure, an electrical connector is manufactured by a process including:
   providing an electrical terminal attached to a wire;
   inserting the electrical terminal within a terminal module having a wire seal assembly with a seal reinforcement device configured to be substantially rigid along a first axis and flexible along a second axis substantially perpendicular to the first axis;
   securing the terminal module within a connector housing via a primary locking mechanism;
   expanding the seal reinforcement device along the second axis, inserting the wire within a wire seal assembly;
   contracting the seal reinforcement device along the second axis such that a cable seal of the wire seal assembly is sealingly engaged with the wire;
   inserting the wire seal assembly within the connector housing such that a housing seal of the wire seal assembly is sealingly engaged with the connector housing and an end of a seal reinforcement device in the wire seal assembly is in contact with the terminal module; and
   attaching a wire seal retainer to the connector housing such that another end of the seal reinforcement device is in contact with the wire seal retainer.

The wire seal retainer is configured to maintain compressive contact between the wire seal assembly and the terminal module, thereby providing a secondary locking mechanism for the terminal module.

In some aspects of the electrical connector described in the preceding paragraph, the wire seal assembly is formed by: injecting a rigid polymeric material having a shore A hardness of at least 75 when cured into a mold to form a seal reinforcement device; and injecting a compliant polymeric material having a shore A hardness in a range of 35 to 45 when cured into a mold to form a cable seal within the seal reinforcement device and a tubular housing seal around the seal reinforcement device.

In some aspects of the electrical connector described in any one of the preceding paragraphs, the rigid polymeric material is selected from a list consisting of polyamide, polybutylene terephthalate, and acrylonitrile butadiene styrene, with or without glass filling and wherein the compliant polymeric material is a silicone rubber material.

BRIEF DESCRIPTION OF THE DRAWINGS

The present invention will now be described, by way of example with reference to the accompanying drawings, in which.

DETAILED DESCRIPTION

This patent application is directed to a sealed electrical connector having primary and secondary locking mechanisms to retain a terminal module within a housing.

Figure 1:
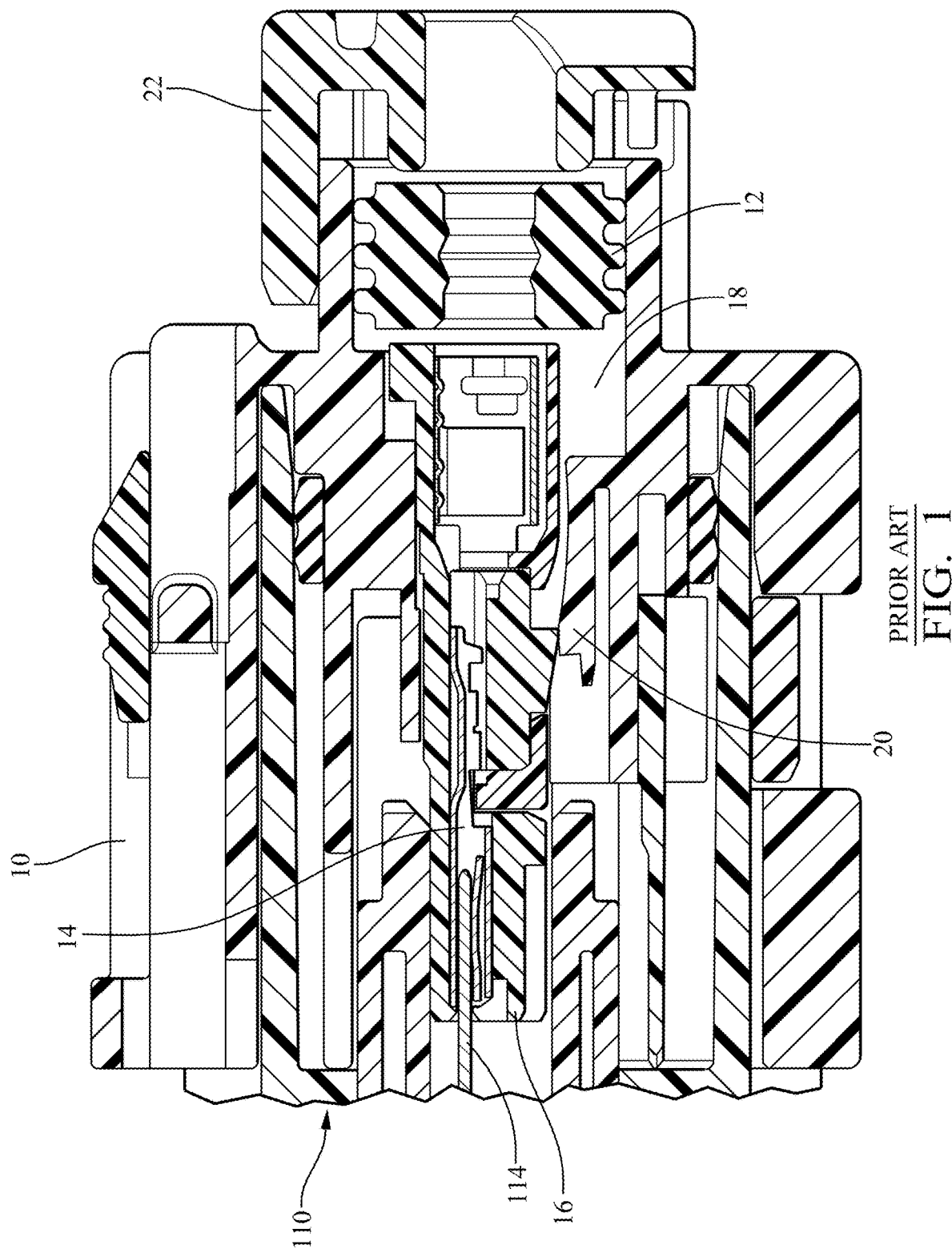
FIG. 1 illustrates a cross-section view of an electrical connector according to the prior art.
Figure 2:
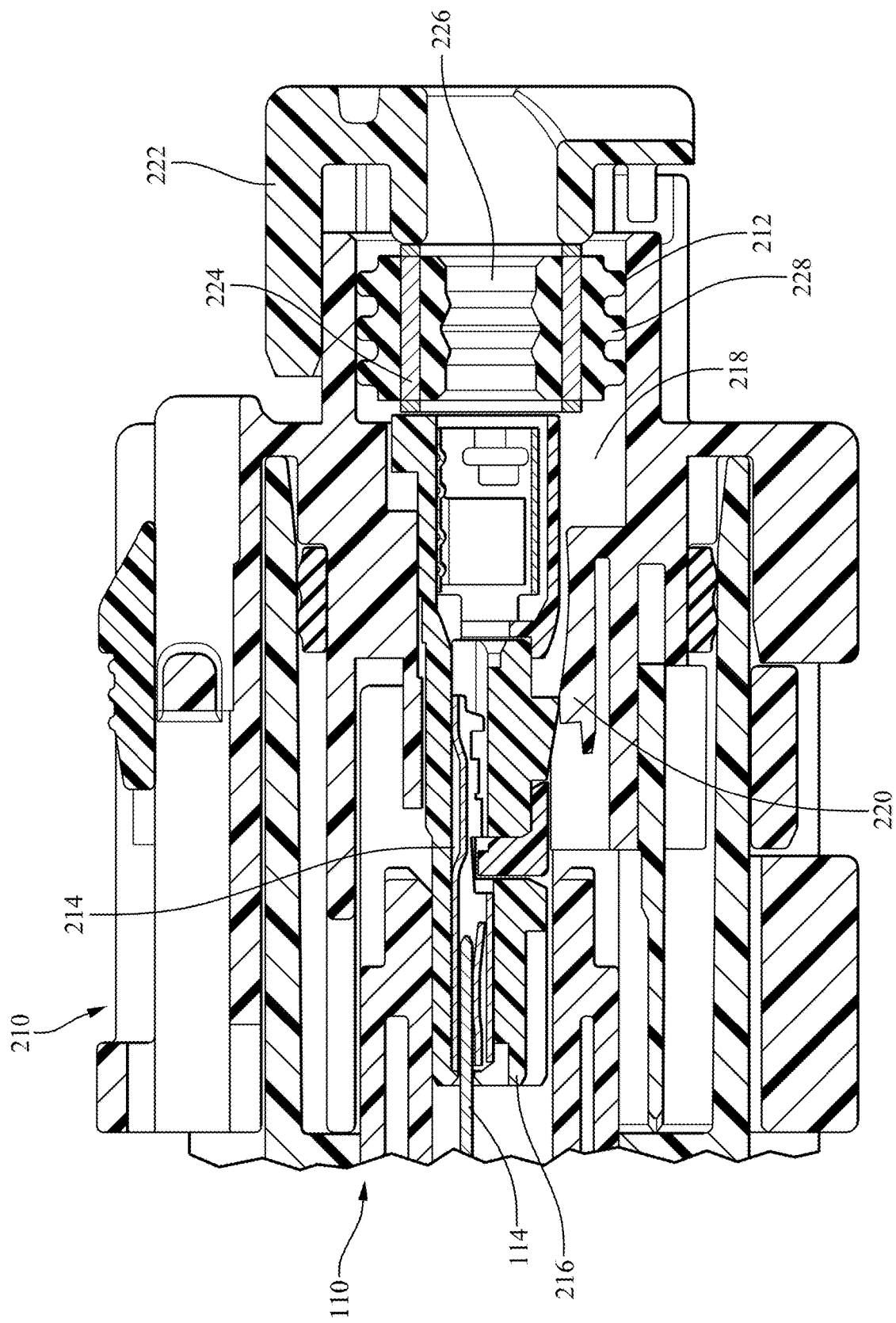
FIG. 2 illustrates a cross-section view of an electrical connector.
Figure 3:
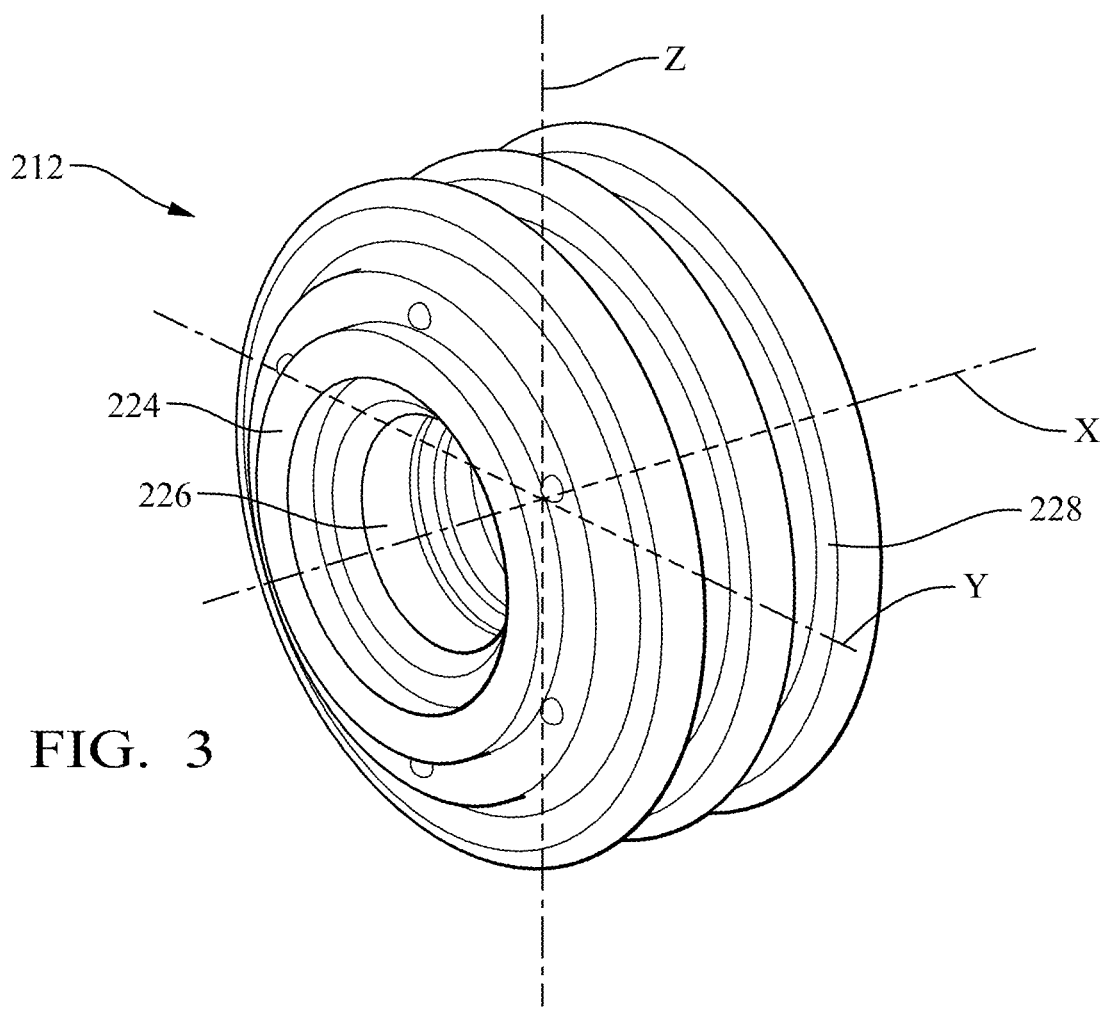
FIG. 3 illustrates an isometric view of a wire seal assembly of the electrical connector of FIG. 2.
Figure 4:
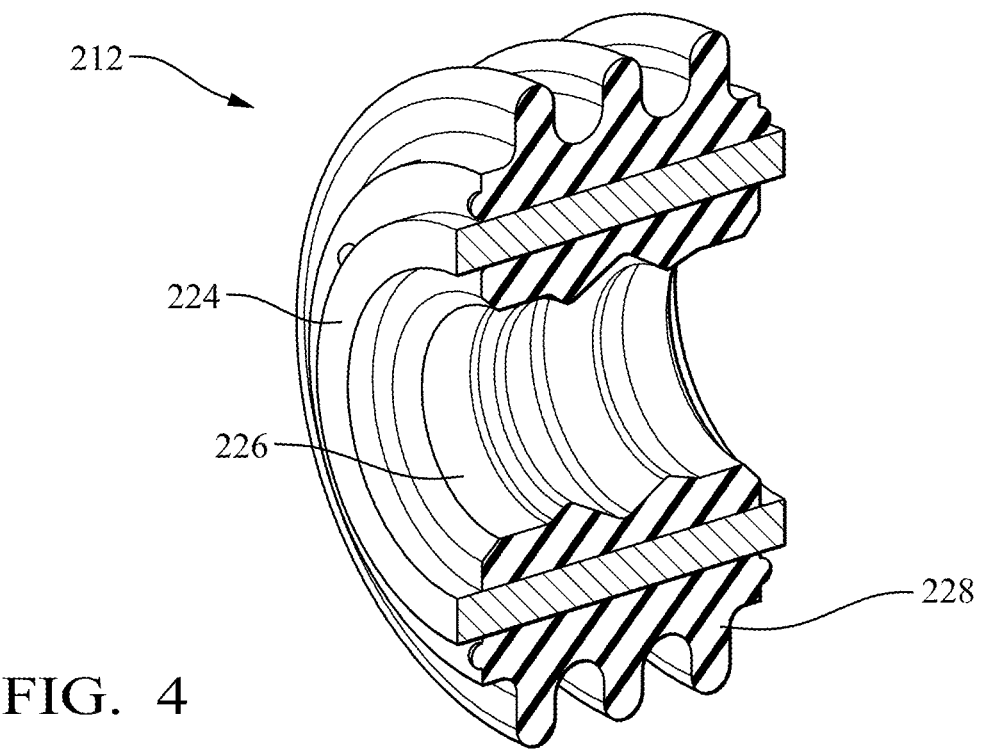
FIG. 4 illustrates a cross-section view of the wire seal assembly of FIG. 3.

The electrical connector 210 shown in FIG. 2 has a similar configuration to the electrical connector 10 discussed in the BACKGROUND section and shown in FIG. 1. However, the construction and function of the wire seal assembly 212 in electrical connector 210 is different. The wire seal assembly 212 of the electrical connector 210 is an assembly that includes a seal reinforcement device 224 in the form of a rigid tube having a cylindrical cable seal 226 inside the seal reinforcement device 224 as shown in FIGS. 3 and 4. As used herein, the term "rigid" means that the material forming the seal reinforcement device 224 has a Shore A hardness that is greater than or equal to 75. The cable seal 226 is configured to seal a wire attached to an electrical terminal 214. The wire seal assembly 212 also includes a cylindrical housing seal 228 located on the outside of the seal reinforcement device 224 that is configured to seal the seal reinforcement device 224 to the connector housing 218. The seal reinforcement device 224 is disposed between the terminal module 216 and the wire seal retainer 222 and is held in compressive contact between them. The seal reinforcement device 224 inhibits the terminal module 216 from being forced from the connector housing 218 in the event of a failure of the primary locking mechanism 220 and the rigidity also inhibits longitudinal motion of the terminal module 216 if a longitudinal force is applied to the electrical terminal 214, the terminal module 216, or the wire attached to the electrical terminal 214. The wire seal assembly 212 also provides better mechanical performance of the secondary locking mechanism by increasing the force necessary to defeat the secondary lock as well as reducing the distance the terminal module 216 can travel before the secondary lock is engaged.

Figure 5A:
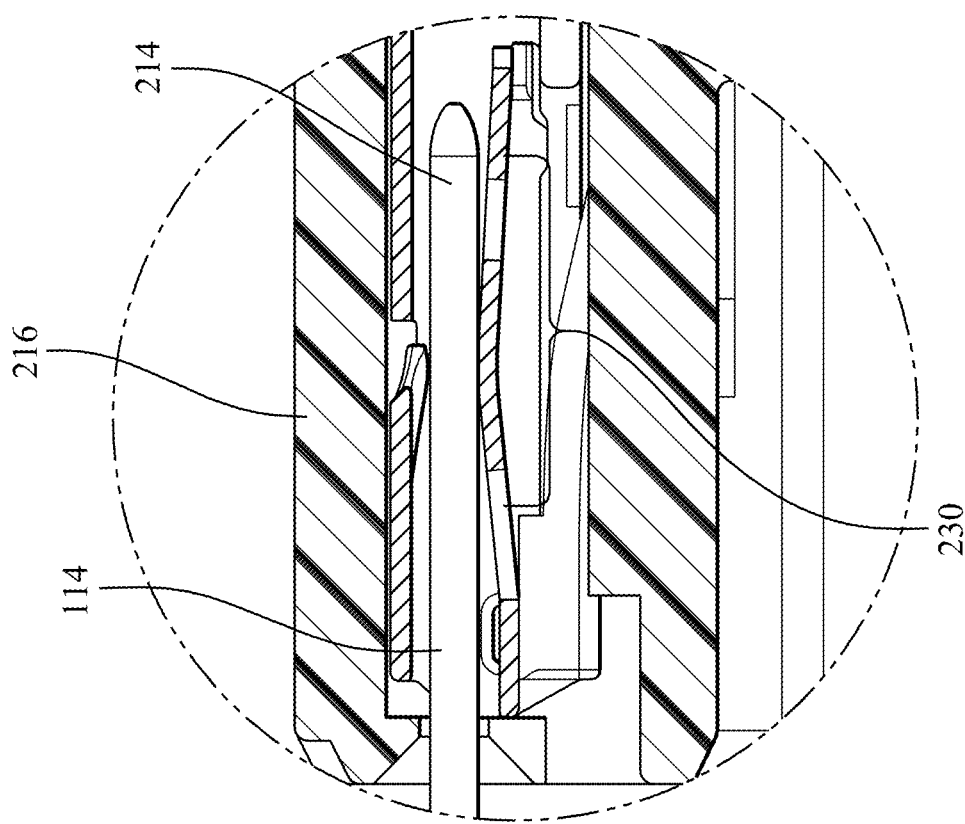
FIG. 5A illustrates close-up cross section view of a terminal of the electrical connector of FIG. 1 according to the prior art.
Figure 5B:
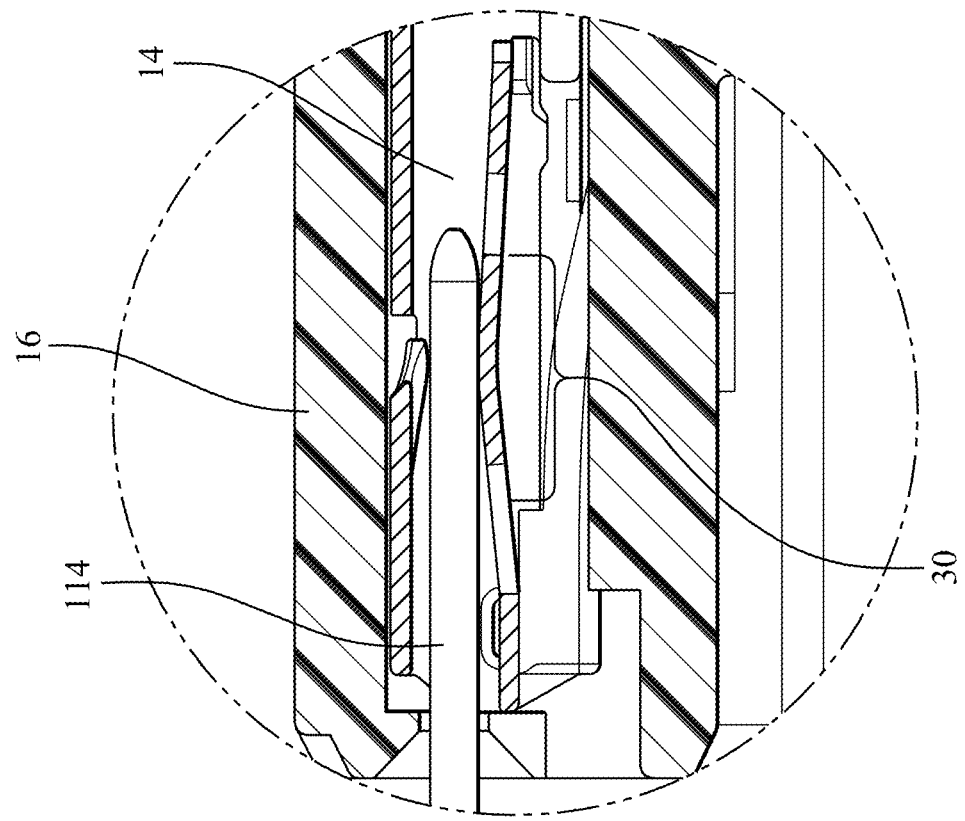
FIG. 5B illustrates a close-up cross section view of a terminal of the electrical connector of FIG. 2.

The wire seal assembly 212 ensures a more robust connection between the electrical terminal 214 in the electrical connector 210 and the mating terminal 114 in the mating connector 110. In the event that the primary locking mechanism 220 is damaged or otherwise defeated, the wire seal assembly 212 does not longitudinally compress against the wire seal retainer 222, thereby maintaining the terminal overlap 230 between the electrical terminal 214 in the electrical connector 210 and the mating terminal 114 in the mating connector 110, as shown in FIG. 5B. In comparison, in the event that the primary locking mechanism 20 is damaged or otherwise defeated, the wire seal assembly 12 may be longitudinally compressed against the retainer 22 such that the terminal overlap 30 between the terminal 14 in the electrical connector 10 and the mating terminal 114 in the mating connector 110, as shown in FIG. 5A, is less than the terminal overlap 230.

Figure 6:
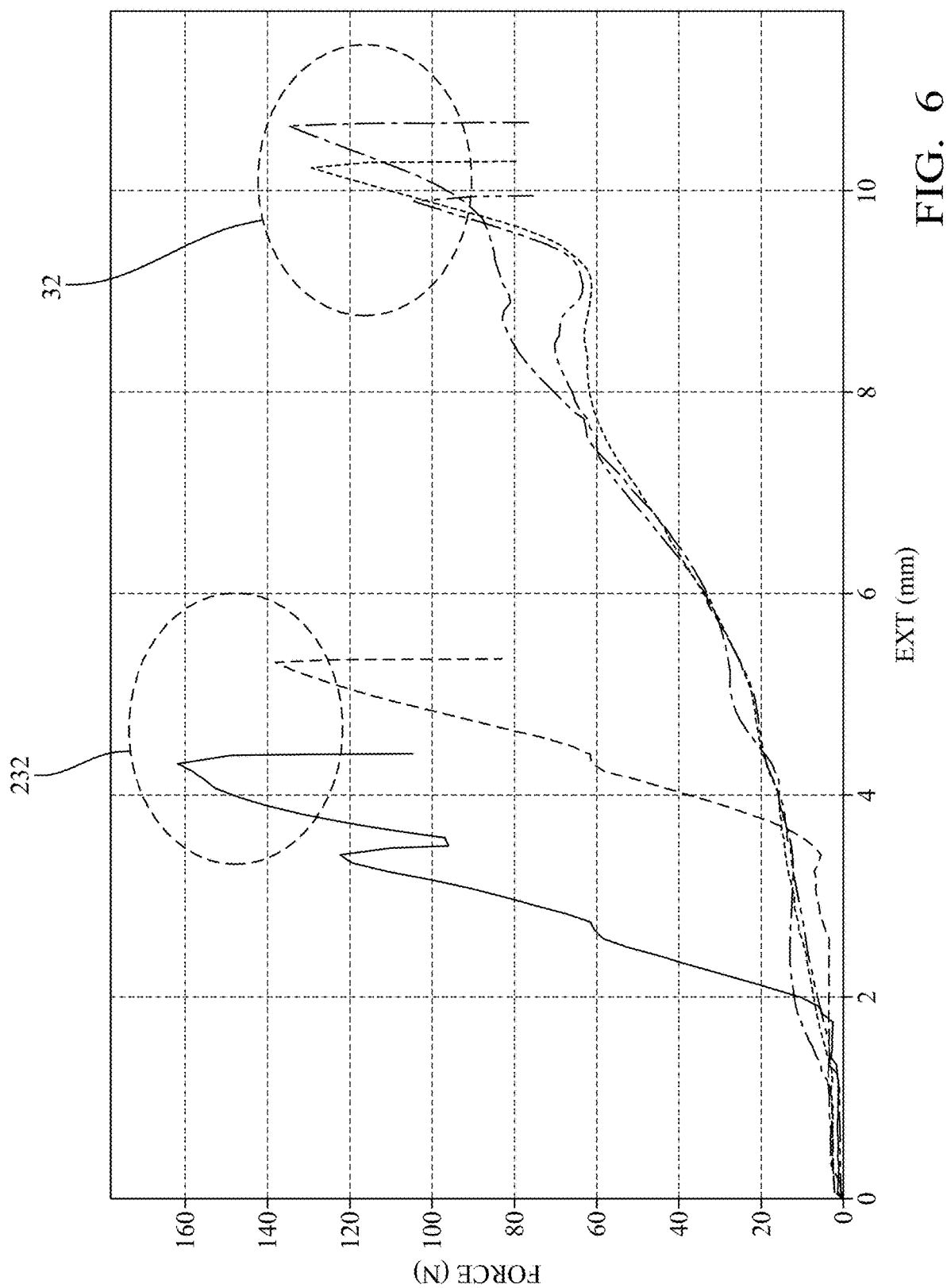
FIG. 6 illustrates a graph comparing terminal pull out forces of the electrical connector of FIG. 1 to the electrical connector of FIG. 2.

As shown in FIG. 6, a displacement force 232 required to dislodge the terminal module 216 from the connector housing 218 after the primary locking mechanism 220 of the electrical connector 210 has failed is greater than a displacement force 32 required to dislodge the terminal module 16 from the connector housing 18 after the primary locking mechanism 20 of the connector 10 has failed. FIG. 6 also shows that the displacement force 232 of the terminal module 216 of the electrical connector 210 prior to reaching the dislodging force level is less than the displacement force 32 of the terminal module 16 of the connector 10.

The seal reinforcement device 224 may extend beyond the ends of the cable seal 226 and the housing seal 228 or may be flush with the ends of cable seal 226 and the housing seal 228. In another embodiment, the seal reinforcement device 224 may extend beyond one end of the cable seal 226 and the housing seal 228 and may be flush with the other end of the cable seal 226 and the housing seal 228. The seal reinforcement device 224 of the wire seal assembly 212 provides the benefit of more uniform contact with the terminal module 216 compared with the seal of U.S. Pat. No. 10,148,032. In addition, the wire seal assembly 212 beneficially provides more uniform sealing between the seal and the cable and the seal and the connector due to the uniform thickness of compliant material in the cable seal 226 and the housing seal 228 that is not present in the previous design. As used herein, the term "compliant" means that the material has a Shore A hardness less than or equal to 45. Further, the seal reinforcement device 224 is more easily co-molded with the cable seal 226 and the housing seal 228 than the separate posts and the seal of U.S. Pat. No. 10,148,032.

The seal reinforcement device 224 may be formed from a material selected from an engineered polymer, such as polyamide (NYLON), polybutylene terephthalate (PBT), or acrylonitrile butadiene styrene (ABS) plastic. The plastic material may or may not include glass filling. The material forming the seal reinforcement device 224 has a Shore A hardness greater than 75.

The cable seal 226 and the housing seal 228 may be formed from a silicone rubber material having a Shore A hardness in a range of 35 to 45, preferably about 40. The material forming the seal reinforcement device 224 preferably has a Shore A hardness at least 20 points higher than the material forming the cable seal 226 and the housing seal 228.

The wire seal assembly 212 may be manufactured using co-molding techniques to form the seal reinforcement device 224, the cable seal 226, and the housing seal 228.

Figure 7:
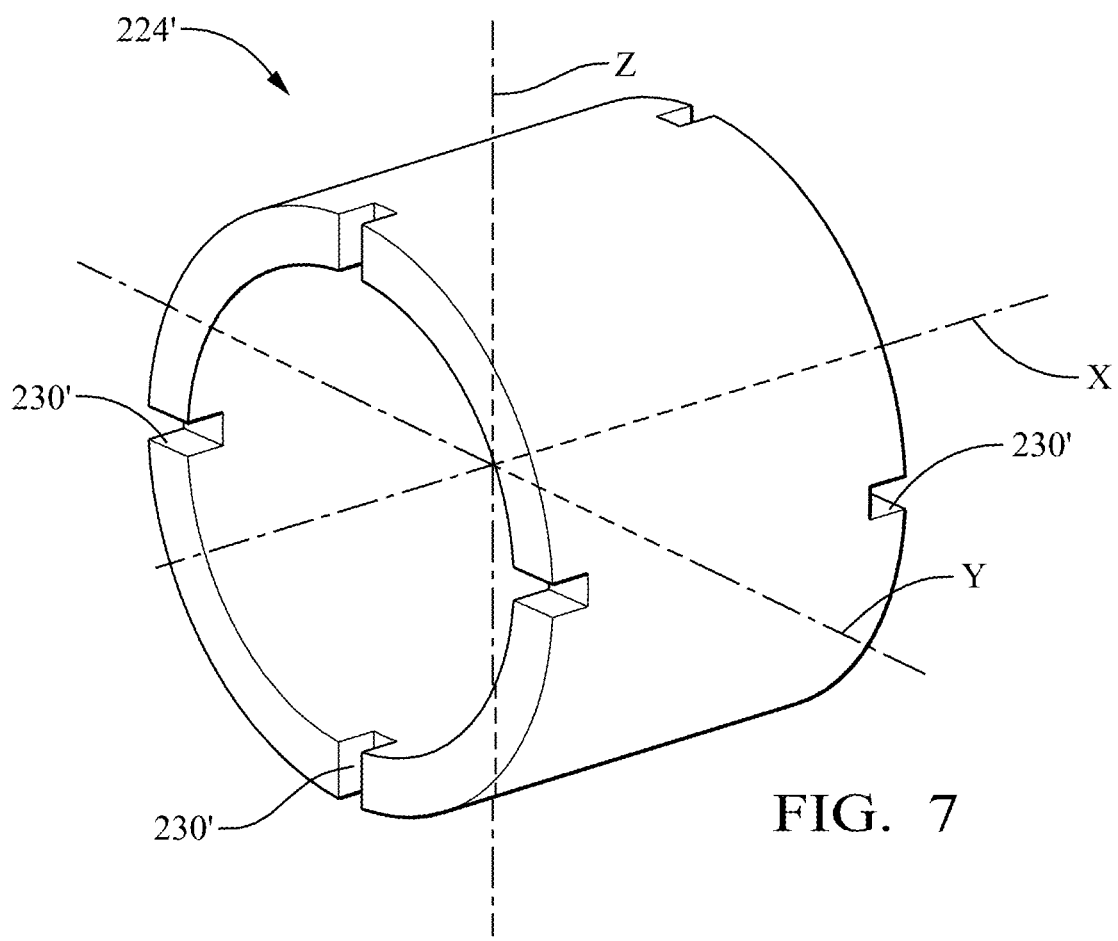
FIG. 7 illustrates an isometric view of a seal reinforcement device of the wire seal assembly of FIG. 3.
Figure 8:
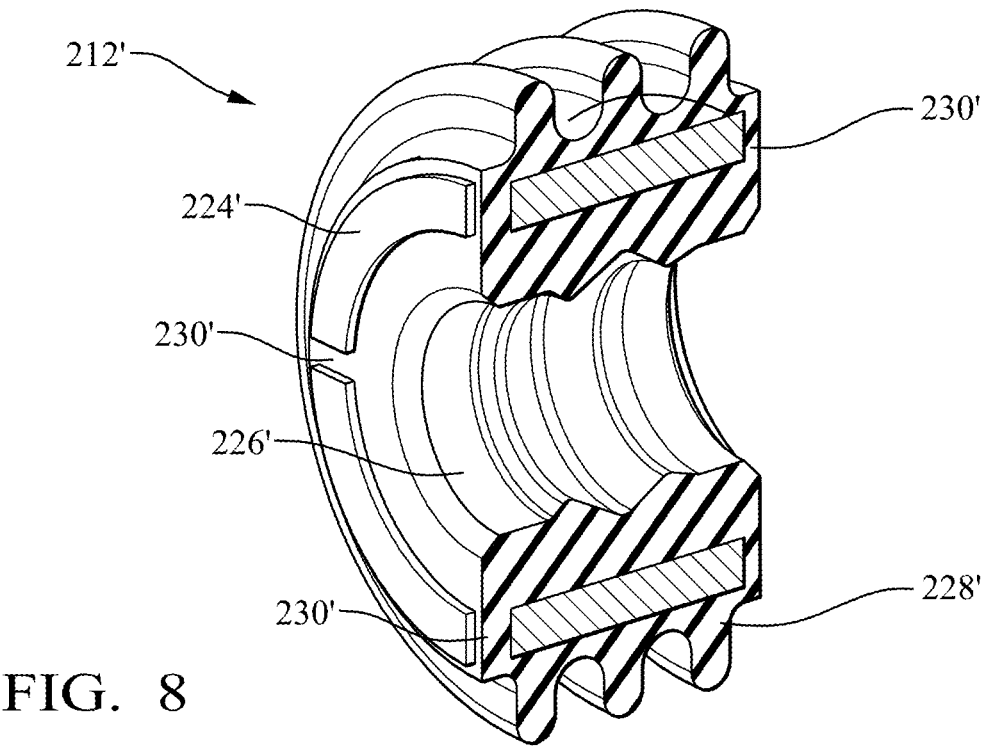
FIG. 8 illustrates a cross-section view of a wire seal assembly.

In an alternative embodiment of the wire seal assembly 212' shown in FIGS. 7 and 8, the cable seal 226' and the housing seal 228' may be integrally formed by defining a plurality of notches 230' or other apertures in the seal reinforcement device 224' so that the compliant material may flow from the outside of the seal reinforcement device 224' to the inside of the seal reinforcement device 224' or vice versa, when the compliant material forming the cable seal 226' and the housing seal 228' is co-molded with the seal reinforcement device 224'. In the illustrated example, the plurality of notches 230' are defined in the ends of the seal reinforcement device 224' and are spaced about 90 degrees apart.

Figure 9:
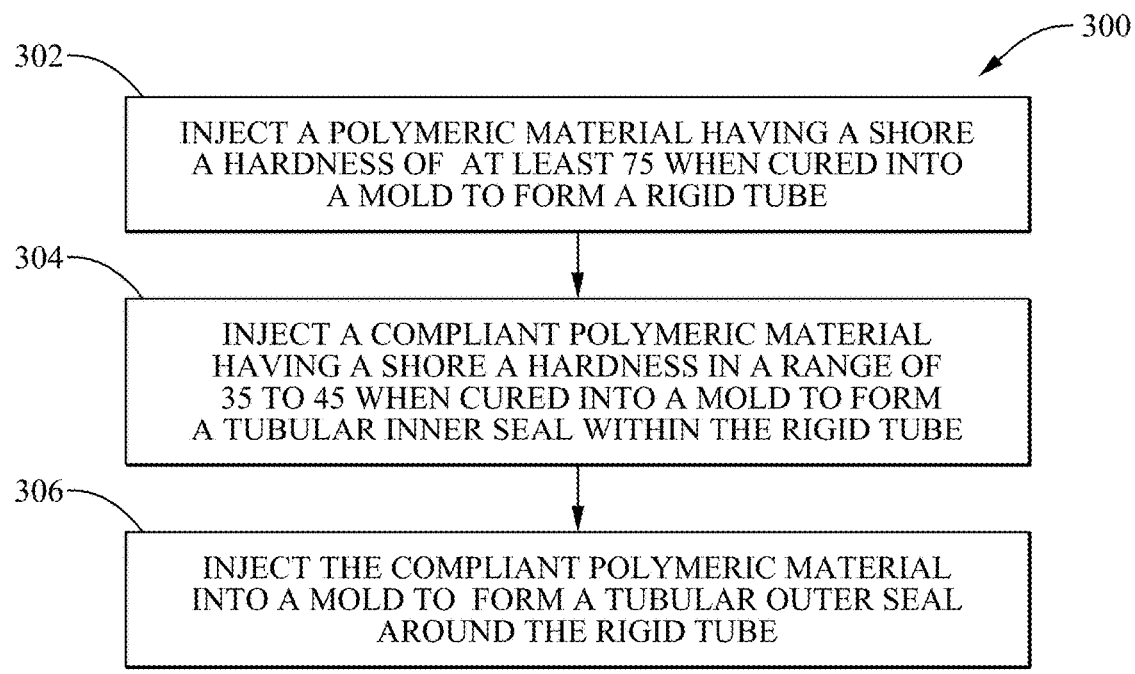
FIG. 9 illustrates a flow chart of a method of manufacturing a wire seal assembly.

A method 300 of manufacturing a wire seal assembly 212 is illustrated in FIG. 9. The method 300 includes the following steps:

STEP 302, INJECT A POLYMERIC MATERIAL HAVING A SHORE A HARDNESS OF AT LEAST 75 WHEN CURED INTO A MOLD TO FORM A SEAL REINFORCEMENT DEVICE, includes injecting a polymeric material having a shore A hardness of at least 75 when cured into a mold to form a seal reinforcement device 224;

STEP 304, INJECT A COMPLIANT POLYMERIC MATERIAL HAVING A SHORE A HARDNESS IN A RANGE OF 35 TO 45 WHEN CURED INTO A MOLD TO FORM A TUBULAR CABLE SEAL WITHIN THE SEAL REINFORCEMENT DEVICE, includes injecting a compliant polymeric material having a shore A hardness in a range of 35 to 45 when cured into a mold to form a tubular cable seal 226 within the seal reinforcement device 224; and STEP 306, INJECT THE COMPLIANT POLYMERIC MATERIAL INTO A MOLD TO FORM A TUBULAR HOUSING SEAL AROUND THE SEAL REINFORCEMENT DEVICE, includes injecting the compliant polymeric material into a mold to form a tubular housing seal 228 around the seal reinforcement device 224.

The seal reinforcement device 224 may extend beyond the ends of the cable seal 226 and the housing seal 228 or may be flush with the ends of the cable seal 226 and the housing seal 228. In another embodiment, the seal reinforcement device 224 may extend beyond one end of the cable seal 226 and the housing seal 228 and may be flush with the other end of the cable seal 226 and the housing seal 228.

The polymeric material used to form the seal reinforcement device 224 may be an engineered polymer such as polyamide (PA, NYLON), polybutylene terephthalate (PBT), and acrylonitrile butadiene styrene (ABS). The polymeric material used to form the seal reinforcement device 224 may or may not be glass fiber filled. The compliant polymeric material used to form the cable and housing seals 226, 228 may be a silicone rubber material.

Figure 10:
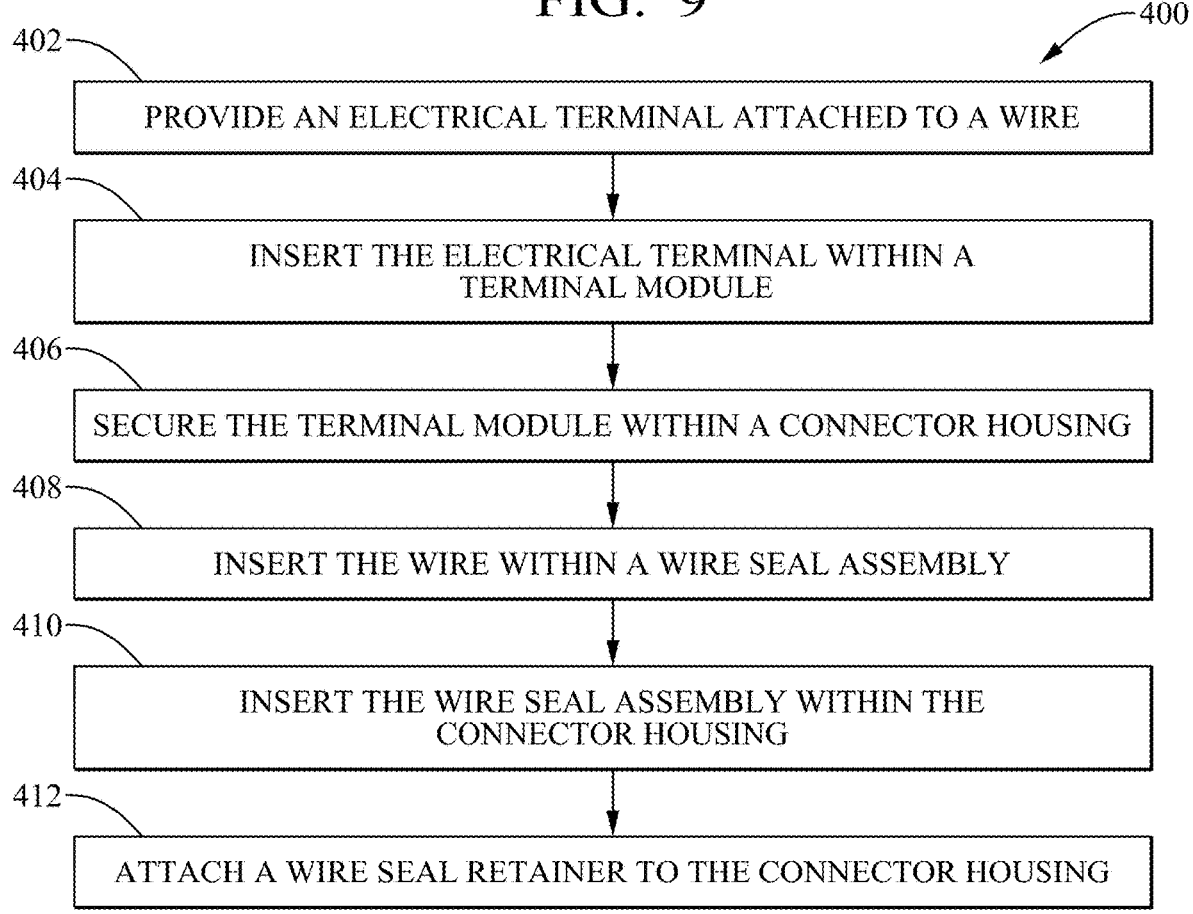
FIG. 10 illustrates a flow chart of a process of forming an electrical connector.

A process 400 of manufacturing an electrical connector 210 is illustrated in FIG. 10. The process 400 includes the following steps:

STEP 402, PROVIDE AN ELECTRICAL TERMINAL ATTACHED TO A WIRE, includes providing an electrical terminal 214 attached to a wire;

STEP 404, INSERT THE ELECTRICAL TERMINAL WITHIN A TERMINAL MODULE, includes inserting the electrical terminal 214 within a terminal module 216;

STEP 406, SECURE THE TERMINAL MODULE WITHIN A CONNECTOR HOUSING, includes securing the terminal module 216 within a connector housing 218 via a primary locking mechanism 220;

STEP 408, INSERT THE WIRE WITHIN A WIRE SEAL ASSEMBLY, includes inserting the wire within a wire seal assembly 212 such that a cable seal 226 of the wire seal assembly 212 is sealingly engaged with the wire;

STEP 410, INSERT THE WIRE SEAL ASSEMBLY WITHIN THE CONNECTOR HOUSING, includes inserting the wire seal assembly 212 within the connector housing 218 such that a housing seal 228 of the wire seal assembly 212 is sealingly engaged with the connector housing 218 and an end of a seal reinforcement device 224 in the wire seal assembly 212 is in contact with the terminal module 216; and STEP 412, ATTACH A WIRE SEAL RETAINER TO THE CONNECTOR HOUSING, includes attaching a wire seal retainer 222 to the connector housing 218 such that another end of the seal reinforcement device 224 is in contact with the wire seal retainer 222. The wire seal retainer 222 is configured to maintain compressive contact between the wire seal assembly 212 and the terminal module 216, thereby providing a secondary locking mechanism for the terminal module 216.

The wire seal assembly 212 may be formed by the method 300 described above.

The polymeric material used to form the seal reinforcement device 224 may be an engineered polymer such as polyamide (PA, NYLON), polybutylene terephthalate (PBT), and acrylonitrile butadiene styrene (ABS). The polymeric material used to form the seal reinforcement device 224 may or may not be glass fiber filled. The compliant polymeric material used to form the cable and housing seals 226, 228 may be a silicone rubber material.

The seal reinforcement device 224 may extend beyond the ends of the cable seal 226 and the housing seal 228 or may be flush with the ends of the cable seal 226 and the housing seal 228. In another embodiment, the seal reinforcement device 224 may extend beyond one end of the cable seal 226 and the housing seal 228 and may be flush with the other end of the cable seal 226 and the housing seal 228.

Figure 11:
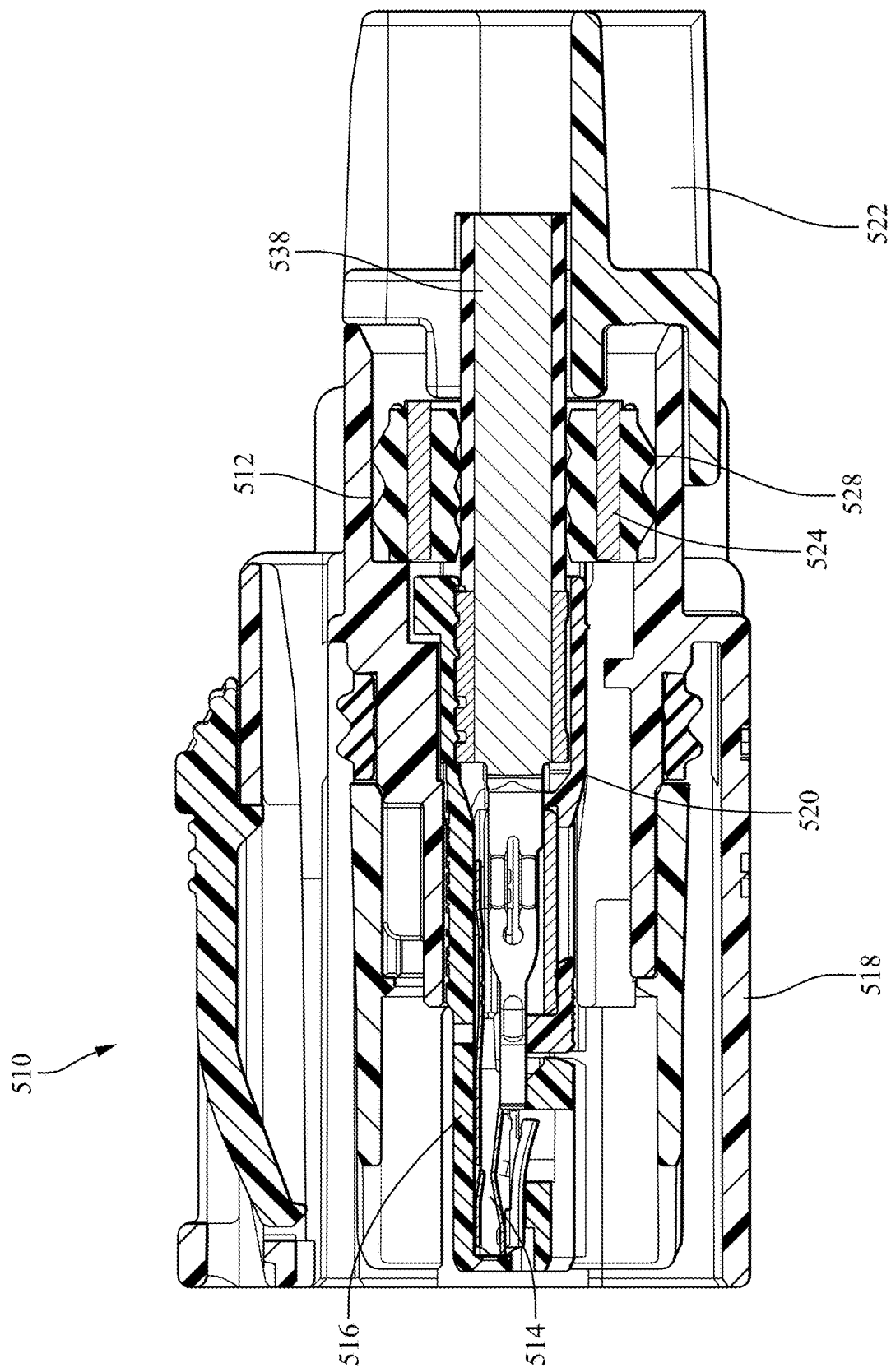
FIG. 11 illustrates a cross-section view of an electrical connector.

The electrical connector 510 shown in FIG. 11 has a similar configuration to the electrical connector 210 described above and shown in FIG. 2. However, the construction of the wire seal assembly 512 in electrical connector 510 is different. The wire seal assembly 512 of the electrical connector 510 is an assembly that includes a seal reinforcement device 524 that provides anti-longitudinal compression features similar to the seal reinforcement device 224 of the electrical connector 210. Wherein the seal reinforcement device 224 is substantially rigid along three orthogonal axes X, Y, Z, the seal reinforcement device 524 is flexible along at least one of three orthogonal axes.

Figure 12:
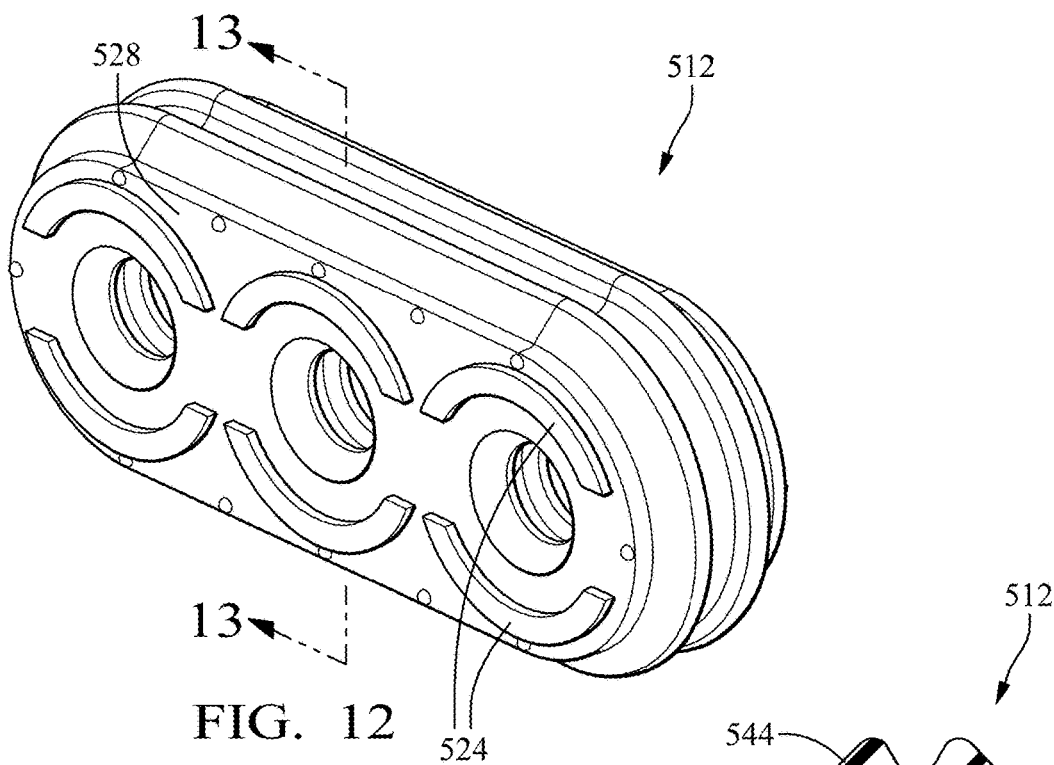
FIG. 12 illustrates an isometric view of a wire seal assembly of the electrical connector of FIG. 11.
Figure 13:
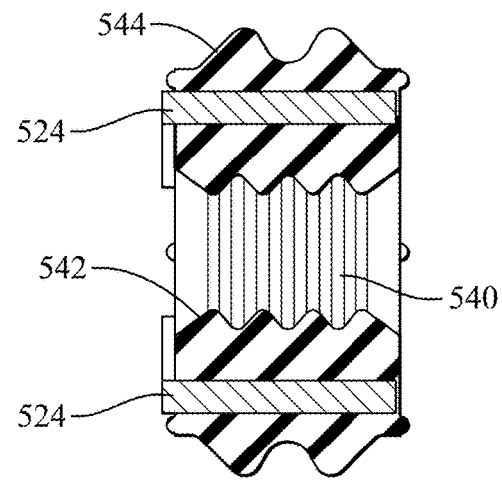
FIG. 13 illustrates a cross-section view of the wire seal assembly of FIG. 11.

The example of the wire seal assembly shown in FIG. 12 contains a plurality of the seal reinforcement device 524 to accompany a plurality of wire cables 538. As shown in FIG. 13, the wire seal assembly 512 also includes a seal 528 that forms a cable seal 542 having a plurality of wire seal passages 540 inside the seal reinforcement devices 524 and a housing seal 544 outside of the seal reinforcement devices 524. The seal 528 is formed of a compliant and resilient elastomeric material, such as a silicone rubber.

Figure 14:
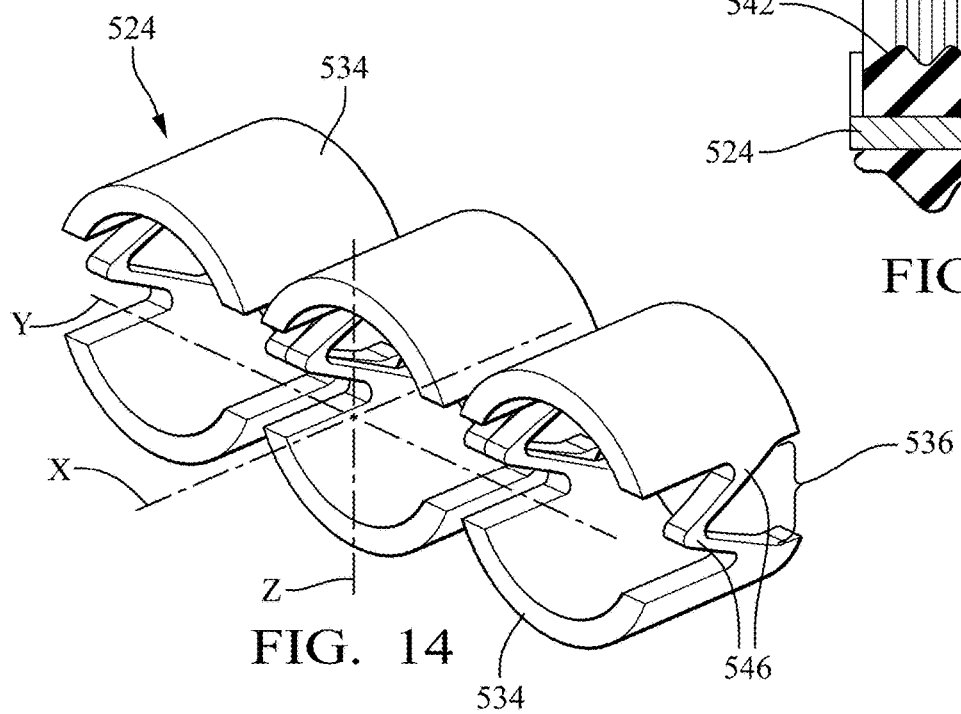
FIG. 14 illustrates an isometric view of a seal reinforcement device of the wire seal assembly of FIG. 11.

As shown in FIG. 14, the seal reinforcement device 524 has a generally cylindrical shape and is formed by two or more cylindrical sectors 534 that are joined by a two or more flexible and resilient spring features 536 that allow a diameter of the seal reinforcement device 524 to increase to along at least one axis Z to facilitate insertion of a wire cable 538 through the wire seal assembly 512 and then decrease back to its original diameter once the wire cable 538 has been inserted into the wire seal assembly 512. In the illustrated example of the seal reinforcement device 524, the flexible spring features 536 are integrally formed with the cylindrical sectors 534.

Each of the resilient spring features 536 are made up of a pair of flexible beams 546 that are joined at one end to form a V-shape and each of the opposite ends are attached to one of the cylindrical sectors 534. Without subscribing to any particular theory of operation, the resilient properties of the beams 546 and the seal 528 cooperate to allow the wire seal passages 540 to expand as a wire cable 538 is inserted within the wire seal passage 540, preferably with the assistance of an expansion tool (not shown). Once the wire cable 538 is inserted within the wire seal passage 540 and the expansion tool is removed from the wire seal passage 540. The flexible nature of the beams 546 and the compliant priorities of the seal 528 cooperate to urge the wire seal passage 540 to contact back to its original configuration.

Although the illustrated example of the wire seal assembly 512 has a plurality of seal reinforcement devices 524 and wire seal passages 540, other examples of the wire seal assembly may have a wire seal assembly with a single reinforcement device 524 and wire seal passage 540.

The seal reinforcement device 524 is disposed between the terminal module 516 and the wire seal retainer 522 and is held in compressive contact between them. The seal reinforcement device 524 inhibits the terminal module 516 from being forced from the connector housing 518 in the event of a failure of the primary locking mechanism 520 and also inhibits longitudinal motion of the terminal module 516 if a longitudinal force is applied to the terminal 514, the terminal module 516, or the wire attached to the terminal 514. The wire seal assembly 512 also provides better mechanical performance of the secondary locking mechanism by both increasing the force necessary to defeat the secondary lock and reducing the distance the terminal module 516 can travel before the secondary lock is engaged.

The wire seal assembly 512 ensures a more robust connection between the terminal 514 in the electrical connector 510 and a mating terminal in a mating connector (not shown). In the event that the primary locking mechanism 520 is damaged or otherwise defeated, the wire seal assembly 512 does not longitudinally compress against the wire seal retainer 522, thereby maintaining the terminal overlap between the terminal 514 in the electrical connector 510 and the mating terminal in the mating connector.

The seal reinforcement device 524 may extend beyond the ends of the seal 528 or may be flush with the ends of the seal 528. In another embodiment, the seal reinforcement device 524 may extend beyond one end of the seal 528 and may be flush with the seal 528. The seal reinforcement device 524 of the wire seal assembly 512 provides the benefit of uniform contact with the terminal module 516. As used herein, the term "compliant" means that the material has a Shore A hardness less than or equal to 45. Further, the seal reinforcement device 524 is more easily co-molded with the seal 528 than the separate posts and the seal of U.S. Pat. No. 10,148,032.

The seal reinforcement device 524 may be formed from an engineered polymer, such as polyamide (NYLON), polybutylene terephthalate (PBT), or acrylonitrile butadiene styrene (ABS) plastic. The plastic material may or may not include glass filling. The material forming the seal reinforcement device 524 has a Shore A hardness greater than 75.

The seal 528 may be formed from a silicone rubber material having a Shore A hardness in a range of 35 to 45, preferably about 40. The material forming the seal reinforcement device 524 preferably has a Shore A hardness at least 20 points higher than the material forming the seal 528.

The wire seal assembly 212 may be manufactured using co-molding techniques to form the seal reinforcement device 224, the cable seal 226, and the housing seal 228.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A wire seal assembly configured to seal a wire cable to a connector housing of an electrical connector, comprising:
   a seal reinforcement device configured to be substantially rigid along a first axis, the seal reinforcement device comprises a plurality of cylindrical sectors arranged opposite one another and a plurality of resilient spring features joining the plurality of cylindrical sectors, the plurality of resilient spring features include a pair of flexible beams that are joined at one end to form a V-shape and each of the opposite ends are attached to one of the cylindrical sectors;
   a compliant cable seal disposed within the seal reinforcement device and in compressive contact with the wire cable; and
   a compliant housing seal axially surrounding the seal reinforcement device and in compressive contact with the connector housing.

2. The wire seal assembly in accordance with claim 1, wherein the seal reinforcement device is flexible along a second axis substantially perpendicular to the first axis.

3. The wire seal assembly in accordance with claim 1, wherein the plurality of resilient spring features are integrally formed with the plurality of cylindrical sectors.

4. The wire seal assembly in accordance with claim 1, wherein the seal reinforcement device is formed from a material selected from a list consisting of polyamide, polybutylene terephthalate, and acrylonitrile butadiene styrene, with or without glass filling.

5. The wire seal assembly in accordance with claim 1, wherein the seal reinforcement device is formed from a polymeric material having a Shore A hardness greater than 75.

6. The wire seal assembly in accordance with claim 1, wherein the cable seal and the housing seal are integrally formed.

7. The wire seal assembly in accordance with claim 1, wherein the cable seal and the housing seal are formed from a silicone rubber material.

8. The wire seal assembly in accordance with claim 1, wherein the cable seal and the housing seal are formed from a compliant polymeric material having a Shore A hardness in a range of 35 to 45.

9. The wire seal assembly in accordance with claim 1, wherein a material forming the seal reinforcement device has a Shore A harness at least 20 points higher than a material forming the cable seal and the housing seal.

10. The wire seal assembly in accordance with claim 1, wherein the seal reinforcement device extends beyond ends of the cable seal and the housing seal.

11. The wire seal assembly in accordance with claim 1, wherein the seal reinforcement device is flush with ends of the cable seal and the housing seal.

12. The wire seal assembly in accordance with claim 1, wherein the seal reinforcement device has a tubular shape.

13. A method of manufacturing a wire seal assembly, comprising:

injecting a rigid polymeric material having a shore A hardness of at least 75 when cured into a mold to form a tubular seal reinforcement device comprising a plurality of cylindrical sectors arranged opposite one another and a plurality of resilient spring features joining the plurality of cylindrical sectors, the plurality of resilient spring features include a pair of flexible beams that are joined at one end to form a V-shape and each of the opposite ends are attached to one of the cylindrical sectors; and injecting a compliant polymeric material having a shore A hardness in a range of 35 to 45 when cured into a mold to form a cable seal within the seal reinforcement device and a tubular housing seal around the seal tubular reinforcement device.

14. The method in accordance with claim 13, wherein the polymeric material is selected from a list consisting of polyamide, polybutylene terephthalate, and acrylonitrile butadiene styrene, with or without glass filling.

15. The method in accordance with claim 13, wherein the compliant polymeric material is a silicone rubber material.

\* \* \* \* \*